United States Patent
Sato et al.

(10) Patent No.: US 12,407,066 B2
(45) Date of Patent: Sep. 2, 2025

(54) SEPARATOR FOR NON-AQUEOUS SECONDARY BATTERY AND NON-AQUEOUS SECONDARY BATTERY

(71) Applicant: TEIJIN LIMITED, Osaka (JP)

(72) Inventors: Megumi Sato, Osaka (JP); Rika Kuratani, Osaka (JP); Yu Nagao, Osaka (JP); Masato Okazaki, Osaka (JP); Satoshi Nishikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 607 days.

(21) Appl. No.: 17/439,610

(22) PCT Filed: Mar. 23, 2020

(86) PCT No.: PCT/JP2020/012705
§ 371 (c)(1),
(2) Date: Sep. 15, 2021

(87) PCT Pub. No.: WO2020/189796
PCT Pub. Date: Sep. 24, 2020

(65) Prior Publication Data
US 2022/0149483 A1    May 12, 2022

(30) Foreign Application Priority Data
Mar. 20, 2019   (JP) .................................. 2019-052384

(51) Int. Cl.
| | | |
|---|---|---|
| *H01M 50/417* | (2021.01) | |
| *H01M 10/0525* | (2010.01) | |
| *H01M 50/409* | (2021.01) | |
| *H01M 50/426* | (2021.01) | |
| *H01M 50/446* | (2021.01) | |
| *H01M 50/451* | (2021.01) | |
| *H01M 50/489* | (2021.01) | |
| *H01M 50/491* | (2021.01) | |

(52) U.S. Cl.
CPC ....... *H01M 50/417* (2021.01); *H01M 50/409* (2021.01); *H01M 50/426* (2021.01); *H01M 50/446* (2021.01); *H01M 50/451* (2021.01); *H01M 10/0525* (2013.01); *H01M 50/489* (2021.01); *H01M 50/491* (2021.01)

(58) Field of Classification Search
CPC ............. H01M 50/417; H01M 50/409; H01M 50/426; H01M 50/446; H01M 50/451; H01M 50/489; H01M 50/491; H01M 50/414; H01M 50/423; H01M 50/431; H01M 50/457; H01M 10/0525; H01M 10/052
See application file for complete search history.

(56) References Cited

U.S. PATENT DOCUMENTS

| | | | |
|---|---|---|---|
| 2010/0068612 A1* | 3/2010 | Nishikawa | .......... H01M 50/457 429/129 |
| 2010/0151325 A1* | 6/2010 | Kasamatsu | .......... H01M 50/449 429/246 |
| 2011/0159347 A1 | 6/2011 | Shibano et al. | |
| 2013/0224552 A1 | 8/2013 | Hong et al. | |
| 2016/0043370 A1 | 2/2016 | Hatta et al. | |
| 2016/0043371 A1* | 2/2016 | Yamada | ............... H01M 50/491 524/436 |
| 2017/0155118 A1* | 6/2017 | Hasegawa | ........... H01M 50/417 |
| 2017/0155120 A1* | 6/2017 | Yoshimaru | .......... H01M 50/417 |
| 2017/0338457 A1 | 11/2017 | Shang et al. | |
| 2018/0071774 A1* | 3/2018 | Honmoto | ................. C08J 7/043 |

FOREIGN PATENT DOCUMENTS

| | | | |
|---|---|---|---|
| CN | 102437303 A | | 5/2012 |
| CN | 103545475 | * | 1/2014 |
| CN | 103545475 A | | 1/2014 |
| JP | 2010-244875 A | | 10/2010 |
| JP | 5429811 B2 | | 2/2014 |
| JP | 2017-152268 A | | 8/2017 |
| JP | 2017152268 | * | 8/2017 |
| WO | 2014/148036 A1 | | 9/2014 |
| WO | WO2016157656 | * | 4/2017 |

OTHER PUBLICATIONS

International Search Report for PCT/JP2020/012705 dated Jun. 30, 2020 [PCT/ISA/210].

* cited by examiner

*Primary Examiner* — Matthew W Van Oudenaren
(74) *Attorney, Agent, or Firm* — Sughrue Mion, PLLC

(57) ABSTRACT

An embodiment of the invention provide a separator for a non-aqueous secondary battery, including a porous substrate; and a heat-resistant porous layer that is provided on one side or on both sides of the porous substrate, and that contains a binder resin and barium sulfate particles, in which an average primary particle diameter of the barium sulfate particles contained in the heat-resistant porous layer is from 0.01 μm to less than 0.30 μm, and in which a volume ratio of the barium sulfate particles in the heat-resistant porous layer is from 30% by volume to less than 50% by volume.

18 Claims, No Drawings

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2020/012705 filed Mar. 23, 2020, claiming priority based on Japanese Patent Application No. 2019-052384 filed Mar. 20, 2019.

TECHNICAL FIELD

The present disclosure relates to a separator for a non-aqueous secondary battery and a non-aqueous secondary battery.

BACKGROUND ART

Non-aqueous secondary batteries represented by lithium ion secondary batteries are widely used as power sources for portable electronic devices such as notebook-size personal computers, mobile phones, digital cameras and camcorders. Recently, for a non-aqueous secondary battery represented by a lithium ion secondary battery, an application thereof as a battery for electric power storage or electric vehicles is being reviewed due to the property of a high energy density thereof. With spread of non-aqueous secondary batteries, it has been increasingly required to enhance safety battery characteristics.

A separator which is one of members constituting a non-aqueous secondary battery requires such heat resistance that a film is not easily broken even when the temperature inside the battery is high in order to ensure safety of the battery. As a separator having improved heat resistance, a separator including a porous layer containing inorganic particles on a porous substrate is known. For example, Patent Document 1 or 2 discloses a separator including a porous layer containing barium sulfate particles on a porous substrate.

Patent Document 1: Japanese Patent No. 5429811
Patent Document 2: International Publication No. 2014/148036

SUMMARY OF INVENTION

Technical Problem

The present inventor made studies, and has found that a separator including a porous layer containing barium sulfate particles on a porous substrate is less likely to generate gas due to decomposition of an electrolytic solution or an electrolyte than a separator including a porous layer containing magnesium hydroxide or alumina on a porous substrate. Therefore, if heat resistance of the porous layer containing barium sulfate particles is further improved, a separator largely contributing to safety of the battery can be provided. In addition, it is also important to increase productivity in a separator using barium sulfate particles.

An embodiment of the present disclosure was achieved under the above described circumstances.

An object of an embodiment of the present disclosure is to provide a separator for a non-aqueous secondary battery which suppress the generation of gas inside of a battery and is excellent in heat resistance and productivity, and to solve the problem.

An object of another embodiment of the present disclosure is to provide a non-aqueous secondary battery which suppress the generation of gas inside of a battery and is excellent in heat resistance and productivity, and to solve the problem.

Solution to Problem

The specific solutions to the problem include the following embodiments.

[1] A separator for a non-aqueous secondary battery, the separator containing:
a porous substrate; and
a heat-resistant porous layer that is provided on one side or on both sides of the porous substrate, and that contains a binder resin and barium sulfate particles,
wherein an average primary particle diameter of the barium sulfate particles contained in the heat-resistant porous layer is from 0.01 µm to less than 0.30 µm, and
wherein a volume ratio of the barium sulfate particles in the heat-resistant porous layer is from 30% by volume to less than 50% by volume.

[2] The separator for a non-aqueous secondary battery according to [1], wherein the binder resin contains a polyvinylidene fluoride type resin.

[3] The separator for a non-aqueous secondary battery according to [2], wherein a weight-average molecular weight of the polyvinylidene fluoride type resin is from 600,000 to 3,000,000.

[4] The separator for a non-aqueous secondary battery according to any one of [1] to [3], wherein the binder resin contains at least one selected from the group consisting of a wholly aromatic polyamide, a polyamideimide, a poly(N-vinylacetamide), a polyacrylamide, a copolymerized polyether polyamide, a polyimide and a polyether imide.

[5] The separator for a non-aqueous secondary battery according to any one of [1] to [4], wherein an area shrinkage ratio of the separator for a non-aqueous secondary battery, when heat-treated at 135° C. for 1 hour, is 30% or less.

[6] The separator for a non-aqueous secondary battery according to any one of [1] to [5], wherein an area shrinkage ratio of the separator for a non-aqueous secondary battery, when heat-treated at 150° C. for 1 hour, is 45% or less.

[7] The separator for a non-aqueous secondary battery according to any one of [1] to [6], wherein a porosity of the heat-resistant porous layer is from 30% to 70%.

[8] The separator for a non-aqueous secondary battery according to any one of [1] to [7], wherein a mass per unit area of the heat-resistant porous layer as a total of both sides is from 1.0 g/m$^2$ to 30.0 g/m$^2$.

[9] The separator for a non-aqueous secondary battery according to any one of [1] to [8], wherein the heat-resistant porous layer is provided on one side of the porous substrate.

[10] A non-aqueous secondary battery that obtains electromotive force by lithium doping and dedoping, the non-aqueous secondary battery containing:
a positive electrode;
a negative electrode; and
the separator for a non-aqueous secondary battery according to any one of [1] to [9], the separator being disposed between the positive electrode and the negative electrode.

Advantageous Effects of Invention

According to an embodiment of the present disclosure, a separator for a non-aqueous secondary battery which suppress the generation of gas inside of a battery and is excellent in heat resistance and productivity is provided.

According to another embodiment of the present disclosure, a non-aqueous secondary battery which suppress the generation of gas inside of a battery and is excellent in heat resistance and productivity is provided.

DESCRIPTION OF EMBODIMENTS

Hereinafter, the embodiments will be described. Further, the description and the Examples thereof illustrate the embodiments, but do not limit the scope of the embodiments.

In the present disclosure, the numerical range denoted by using "to" represents the range inclusive of the number written before and after "to" as the minimum and maximum values. Regarding stepwise numerical ranges designated in the present disclosure, an upper or lower limit set forth in a certain numerical range may be replaced by an upper or lower limit of another stepwise numerical range described. Besides, an upper or lower limit set forth in a certain numerical range of the numerical ranges designated in the disclosure may be replaced by a value indicated in Examples.

In the present disclosure, the term "process" includes not only an independent process, but also the process which is not clearly distinguished from other processes but achieves the desired purpose thereof.

In the present disclosure, when the amount of each component in a composition is referred to and when a plurality of substances corresponding to each component are present in the composition, the total amount of the plurality of components present in the composition is meant unless otherwise specified.

In the present disclosure, a "MD" means a longitudinal direction (that is, the conveyance direction) in a porous substrate and a separator produced into a long shape, and is also referred to as a "machine direction". In addition, a "TD direction" means a direction orthogonal to the "MD", and is also referred to as a "transverse direction".

In the present disclosure, the notation of "(meth)acrylic" means "acrylic" or "methacrylic".

In the present disclosure, "monomer unit" of a resin means a constituent unit of the resin, and means a constituent unit obtained by polymerizing a monomer.

In the present disclosure, a combination of two or more preferred aspects is a more preferred aspect.

In the present disclosure, when there are a plurality of substances corresponding to each component in the composition, the amount of each component in a composition or a layer means the total amount of a plurality of substances present in the composition unless otherwise specified.

In the present disclosure, "% by mass" and "% by weight" have the same meaning, and "parts by mass" and "parts by weight" have the same meaning.

In the present disclosure, a heat-resistant resin refers to a resin having a melting point of 200° C. or higher, or a resin having no melting point and having a decomposition temperature of 200° C. or higher. That is, the heat-resistant resin in the present disclosure is a resin that is not melted or decomposed in a temperature range of lower than 200° C.

<Separator for Non-Aqueous Secondary Battery>

A separator for a non-aqueous secondary battery (also simply referred to as "separator") of the present disclosure includes a porous substrate and a heat-resistant porous layer provided on one side or on both sides of the porous substrate.

In the separator of the present disclosure, the heat-resistant porous layer contains a binder resin and barium sulfate particles, and an average primary particle diameter of the barium sulfate particles contained in the heat-resistant porous layer is from 0.01 μm to less than 0.30 μm, and a volume ratio of the barium sulfate particles in the heat-resistant porous layer is from 30% by volume to less than 50% by volume.

Barium sulfate particles are less likely to decompose an electrolytic solution or an electrolyte than magnesium hydroxide or alumina, and are therefore less likely to generate gas. Therefore, by using barium sulfate particles as an inorganic filler of the heat-resistant porous layer, a separator that is less likely to generate gas and less likely to cause battery swelling or deformation can be obtained.

In the separator of the present disclosure, an average primary particle diameter of the barium sulfate particles contained in the heat-resistant porous layer is less than 0.30 μm from the viewpoint of increasing heat resistance of the heat-resistant porous layer. When the average primary particle diameter of the barium sulfate particles is less than 0.30 μm, the heat resistance of the heat-resistant porous layer increases. A mechanism for this is considered as follows. That is, the small particle sizes of the barium sulfate particles increase the surface area of the barium sulfate particles per unit volume (specific surface area), and therefore the number of contact points between the barium sulfate particles and the binder resin increases. Therefore, shrinkage of the heat-resistant porous layer when being exposed to a high temperature is considered to be suppressed. In addition, it is presumed that a large number of barium sulfate particles having small particle sizes are connected to each other, and therefore the heat-resistant porous layer is hardly broken when being exposed to a high temperature.

The average primary particle diameter of the barium sulfate particles is less than 0.30 μm, more preferably 0.28 μm or less, and still more preferably 0.25 μm or less from the above viewpoint.

In the separator of the present disclosure, the average primary particle diameter of the barium sulfate particles contained in the heat-resistant porous layer is 0.01 μm or more, more preferably 0.05 μm or more, and still more preferably 0.10 μm or more from the viewpoint of suppressing aggregation of the particles to form a highly uniform heat-resistant porous layer.

Hereinafter, the details of the porous substrate and the heat-resistant porous layer included in the separator of the present disclosure will be described.

[Porous Substrate]

The porous substrate in the present disclosure refers to a substrate having pores or voids therein. As the substrate, a microporous film; a porous sheet such as non-woven fabric composed of a fibrous material, and paper; a composite porous sheet in which on a microporous film or a porous sheet, one or more of another porous layer are laminated; and the like may be listed. In the present disclosure, a microporous film is preferable from the viewpoint of thinning and strength of a separator.

The microporous film refers to a film having a large number of micropores therein, having a structure in which these micropores are connected to each other, and allowing gas or liquid to pass from one side to the other side.

As the material for the porous substrate, materials having electrical insulation are preferably used and any of organic materials and inorganic materials may be used.

It is preferred that the porous substrate contains a thermoplastic resin, from the viewpoint of imparting a shutdown function to the porous substrate. The shutdown function refers to a function of dissolving the constituent material to clog the pores of the porous substrate, thereby blocking ionic migration, and preventing thermal runaway of a battery, when the battery temperature is raised. As the thermoplastic resin, a thermoplastic resin having a melting point less than 200° C. is preferred. As the thermoplastic resin, for example, polyesters such as polyethylene terephthalate; polyolefins such as polyethylene and polypropylene; and the like may be mentioned, and among them, polyolefins are preferred.

As the porous substrate, a microporous film containing polyolefin (referred to as "polyolefin microporous film") is preferred. As the polyolefin microporous film, for example, a polyolefin microporous film which is applied to the conventional separator for a battery may be mentioned, and among them, it is preferred to select those having sufficient mechanical properties and ion permeability.

It is preferred that the polyolefin microporous film contains polyethylene, from the viewpoint of exhibiting the shutdown function. The content of polyethylene in the polyolefin microporous film is preferably 95% by mass or more with respect to the total mass of the polyolefin microporous film.

It is preferred that the microporous film contains polypropylene, from the viewpoint of imparting heat resistance to the extent that the film is not easily broken when exposed to a high temperature.

It is preferred that the polyolefin microporous film contains polyethylene and polypropylene, from the viewpoint of imparting shutdown function and heat resistance that the film is not easily broken when exposed to a high temperature. As the polyolefin microporous film, a microporous film in which polyethylene and polypropylene are present in a mixed state in a layer may be mentioned. It is preferred that the microporous film contains 95% by mass or more of polyethylene and more than 0% by mass to 5% by mass or less of polypropylene, from the viewpoint of compatibility of the shutdown function and heat resistance. In addition, from the viewpoint of compatibility of the shutdown function and heat resistance, a polyolefin microporous film having a lamination structure with two or more layers, in the laminated structure, at least one layer contains polyethylene and at least one layer contains polypropylene, is also preferred.

As the polyolefin contained in the polyolefin microporous film, a polyolefin having a weight-average molecular weight (Mw) of from 100,000 to 5,000,000 is preferred. In the case that the polyolefin has a Mw of 100,000 or more, sufficient mechanical properties may be provided to the microporous film. Meanwhile, the polyolefin has a Mw of 5,000,000 or less, the shutdown characteristic of the microporous film is favorable, and film molding of the microporous film is easy.

The weight-average molecular weight can be measured by gel permeation chromatography (GPC). Details of the measurement by GPC will be described later.

Examples of the method for manufacturing the polyolefin microporous film include, a method containing extruding a molten polyolefin resin from a T-die to form a sheet, crystallizing and elongating the sheet, and further subjecting the sheet to heat treatment, thereby obtaining a microporous film; and a method containing extruding a polyolefin resin melted with a plasticizer such as liquid paraffin from a T-die, cooling it to form a sheet, elongating the sheet, extracting the plasticizer, and performing heat treatment, thereby obtaining a microporous film.

As the porous sheet composed of a fibrous material, non-woven fabric composed of fibrous materials such as polyesters such as polyethylene terephthalate; polyolefins such as polyethylene and polypropylene; thermal resistant resins such as wholly aromatic polyamide, polyamideimide, polyimide, polyethersulfone, polysulfone, polyetherketone and polyetherimide; fibrous material of cellulose; and the like, or paper may be mentioned.

Examples of the composite porous sheet include a sheet in which a functional layer is stacked on a porous sheet made of a microporous film or a fibrous material. Such a composite porous sheet is preferable from the viewpoint that a function can be further added thereto with a functional layer. Examples of the functional layer include a porous layer made of a heat-resistant resin and a porous layer made of a heat-resistant resin and an inorganic filler from the viewpoint of imparting heat resistance.

Examples of the heat-resistant resin include one or more heat-resistant resins selected from the group consisting of a wholly aromatic polyamide, a polyimide, a polyethersulfone, a polysulfone, a polyetherketone, and a polyetherimide.

Examples of the inorganic filler include a metal oxide such as alumina, and a metal hydroxide such as magnesium hydroxide.

Examples of a method of forming a composite include a method of applying a functional layer to a microporous film or a porous sheet, a method of bonding a microporous film or a porous sheet and a functional layer with an adhesive, and a method of thermally press-bonding a microporous film or a porous sheet with a functional layer.

The surface of the porous substrate may be subjected to various surface treatments within the range of not impairing the nature of the porous substrate, for the purpose of improving wettability with the coating liquid for forming the heat-resistant porous layer. As the surface treatment, corona treatment, plasma treatment, flame treatment, UV irradiation treatment, and the like may be mentioned.

~Characteristics of Porous Substrate~

The thickness of the porous substrate is preferably 15 μm or less, more preferably 12 μm or less, from the viewpoint of enhancing energy density of the battery. The thickness of the porous substrate is preferably 4 μm or more, more preferably 6 μm or more, from the viewpoint of production yield of the separator and production yield of the battery.

The Gurley value of the porous substrate (JIS P8117: 2009) is preferably from 50 sec/100 ml to 400 sec/100 ml from the viewpoint of ion permeability or suppression of battery short circuit.

The porous substrate preferably has a porosity of from 20% to 60% from the viewpoint of obtaining an appropriate film resistance and a shutdown function. The porosity ε (%) of the porous substrate is determined by the following formula.

$$\varepsilon = \{1-(Wa/da+Wb/db+Wc/dc+\ldots+Wn/dn)/t\}\times 100$$

Here, the constituent materials of the porous substrate are represented by a, b, c, . . . , n, the mass of each constituent material is Wa, Wb, Wc, . . . , or Wn (g/cm$^2$), the true density of each constituent material is represented by da, db, dc, . . . , or do (g/cm$^3$), and the thickness of the porous substrate is represented by t (cm).

The porous substrate preferably has an average pore size of from 20 nm to 100 nm from the viewpoint of ion permeability or suppression of battery short circuit. The average pore size of the porous substrate is measured using a palm porometer according to ASTM E1294-89.

The puncture strength of the porous substrate is preferably 200 g or more from the viewpoint of production yield of the separator and production yield of the battery. The puncture strength of the porous substrate is measured by performing a puncture test under the condition of a curvature radius of a needle tip of 0.5 mm, and a puncture speed of 2 mm/sec, using a KES-G5 handy compression tester from KATO TECH CO., LTD., to obtain a maximum puncture load (g).

[Heat-Resistant Porous Layer]

In the separator of the present disclosure, the heat-resistant porous layer contains at least a binder resin and barium sulfate particles. The heat-resistant porous layer is a layer having a large number of micropores and allowing gas or liquid to pass therethrough from one side to the other side.

In the separator of the present disclosure, the heat-resistant porous layer may be provided only on one side of the porous substrate, or may be provided on both sides of the porous substrate. When the heat-resistant porous layers are provided on both sides of the porous substrate, the heat resistance of the separator is more excellent, and the safety of a battery can be further improved. In addition, the separator is less likely to be curled, and has excellent handleability during production of a battery. When the heat-resistant porous layer is provided only on one side of the porous substrate, the separator has better ion permeability. In addition, the thickness of the entire separator can be suppressed, and a battery having a higher energy density can be produced.

Binder Resin

The heat-resistant porous layer of the present disclosure includes binder resin.

The kind of the binder resin of the heat-resistant porous layer is not particularly limited as long as being able to bond inorganic particles. The binder resin of the heat-resistant porous layer is preferably a heat-resistant resin (a resin having a melting point of 200° C. or higher, or a resin having no melting point and having a decomposition temperature of 200° C. or higher). The binder resin of the heat-resistant porous layer is preferably a resin that is stable to an electrolytic solution and is also electrochemically stable. The binder resins may be used singly or in combination of two or more kinds thereof.

The binder resin of the heat-resistant porous layer preferably has adhesiveness to an electrode of a battery, and the kind of the binder resin may be selected according to the composition of a positive electrode or a negative electrode. When the heat-resistant porous layers are provided on both sides of the porous substrate, the binder resin of one of the heat-resistant porous layers and the binder resin of the other heat-resistant porous layer may be the same as or different from each other.

As the binder resin of the heat-resistant porous layer, a polymer having a polar functional group or atomic group (for example, a hydroxy group, a carboxy group, an amino group, an amide group, or a carbonyl group) is preferable.

Specific examples of the binder resin of the heat-resistant porous layer include a polyvinylidene fluoride type resin, a wholly aromatic polyamide, a polyamideimide, a polyimide, a polyether sulfone, a polysulfone, a polyether ketone, a polyketone, a polyether imide, a poly-N-vinylacetamide, a polyacrylamide, a copolymerized polyether polyamide, a fluorinated rubber, an acrylic type resin, a styrene-butadiene copolymer, a cellulose, and a polyvinyl alcohol.

The binder resin of the heat-resistant porous layer may be a particulate resin, and examples thereof include resin particles of a polyvinylidene fluoride type resin, a fluorinated rubber, and a styrene-butadiene copolymer. The binder resin of the heat-resistant porous layer may be a water-soluble resin such as a cellulose or a polyvinyl alcohol. When a particulate resin or a water-soluble resin is used as the binder resin of the heat-resistant porous layer, the binder resin is dispersed or dissolved in water to prepare a coating liquid, and the heat-resistant porous layer can be formed on a porous substrate using the coating liquid by a dry coating method.

As the binder resin of the heat-resistant porous layer, a wholly aromatic polyamide, a polyamideimide, a poly-N-vinylacetamide, a polyacrylamide, a copolymerized polyether polyamide, a polyimide, or a polyetherimide is preferable from the viewpoint of excellent heat resistance. These resins are preferably heat-resistant resins (resins each having a melting point of 200° C. or higher, or resins each having no melting point and having a decomposition temperature of 200° C. or higher).

Among the heat-resistant resins, a wholly aromatic polyamide (aramid) is preferable from the viewpoint of durability. A meta type or para type wholly aromatic polyamide may be used. Among wholly aromatic polyamides, a meta type wholly aromatic polyamide is preferable from the viewpoints of easy formation of a porous layer and excellent oxidation-reduction resistance in an electrode reaction. A small amount of an aliphatic monomer may be copolymerized in a wholly aromatic polyamide.

As the wholly aromatic polyamide used as the binder resin of the heat-resistant porous layer, specifically, polymetaphenylene isophthalamide or polyparaphenylene terephthalamide is preferable, and polymetaphenylene isophthalamide is more preferable.

As the binder resin of the heat-resistant porous layer, a polyvinylidene fluoride type resin (PVDF type resin) is preferable from the viewpoint of adhesiveness to an electrode.

The PVDF type resin is suitable as the binder resin of the heat-resistant porous layer from the viewpoint of adhesiveness to an electrode. By inclusion of the PVDF type resin in the heat-resistant porous layer, the adhesiveness between the heat-resistant porous layer and an electrode is improved. As a result, the strength (cell strength) of a battery is improved.

Examples of the PVDF type resin include a homopolymer of vinylidene fluoride (that is, polyvinylidene fluoride); a copolymer of vinylidene fluoride and another monomer (polyvinylidene fluoride copolymer); and a mixture of polyvinylidene fluoride and a polyvinylidene fluoride copolymer. Examples of the monomer copolymerizable with vinylidene fluoride include tetrafluoroethylene, hexafluoropropylene, trifluoroethylene, chlorotrifluoroethylene, trichloroethylene, vinyl fluoride, trifluoroperfluoropropyl ether, ethylene, (meth)acrylic acid, methyl (meth)acrylate, (meth)acrylate, vinyl acetate, vinyl chloride, and acrylonitrile. These monomers may be used singly or in combination of two or more kinds thereof.

As the PVDF type resin contained in the heat-resistant porous layer, a copolymer containing a vinylidene fluoride monomer unit (VDF unit) and a hexafluoropropylene monomer unit (HFP unit) (VDF-HFP copolymer) is more preferable from the viewpoint of adhesiveness to an electrode. When the VDF-HFP copolymer is used as the binder resin of the heat-resistant porous layer, the crystallinity of the binder resin and heat resistance can be easily controlled within an appropriate range, and flow of the heat-resistant porous layer can be suppressed during heat pressing for bonding the separator to an electrode.

The VDF-HFP copolymer contained in the heat-resistant porous layer may be a copolymer containing only a VDF unit and an HFP unit, or a copolymer containing a VDF unit, an HFP unit and other monomer units which are different from the VDF unit and the HFP unit. Examples of the other monomers include tetrafluoroethylene, trifluoroethylene, chlorotrifluoroethylene, trichloroethylene, and vinyl fluoride.

The content of the VDF unit in the VDF-HFP copolymer is preferably 91% by mol or more from the viewpoint of controlling the crystallinity of the VDF-HFP copolymer and heat resistance within an appropriate range.

The content of the HFP unit in the VDF-HFP copolymer is preferably 1% by mol or more, and more preferably 2% by mol or more from the viewpoint of appropriate swelling at the time of impregnation with an electrolytic solution and excellent adhesiveness by wet heat press, and preferably 7% by mol or less, and more preferably 6% by mol or less from the viewpoint of difficulty in dissolving in the electrolytic solution.

The PVDF type resin contained in the heat-resistant porous layer preferably has a weight-average molecular weight (Mw) of from 600,000 to 3,000,000. When the Mw of the PVDF type resin is 600,000 or more, it is easy to obtain a heat-resistant porous layer having mechanical properties capable of withstanding heat pressing when the separator is bonded to an electrode, and adhesiveness between the electrode and the heat-resistant porous layer is improved. The Mw of the PVDF type resin is more preferably 800,000 or more, and still more preferably 1,000,000 or more from this viewpoint. Meanwhile, when the Mw of the PVDF type resin is 3,000,000 or less, the viscosity of the heat-resistant porous layer at the time of molding does not become too high, favorable moldability and crystal formation can be obtained, and the heat-resistant porous layer easily becomes porous. The Mw of the PVDF type resin is more preferably 2,500,000 or less, and still more preferably 2,000,000 or less from this viewpoint.

The weight-average molecular weight of the binder resin in the heat-resistant porous layer is measured by the gel permeation chromatography (GPC). The measurement is performed under the conditions of a temperature of 40° C. and a flow rate of 10 mL/min using a GPC apparatus "GPC-900" produced by JASCO Corporation, two TSKgel SUPER AWM-H produced by Tosoh Corporation as a column, and dimethylformamide as a solvent, and a molecular weight in terms of polystyrene is obtained.

The PVDF type resin contained in the heat-resistant porous layer preferably has an acid value of from 3 mgKOH/g to 20 mgKOH/g.

The acid value of the PVDF type resin can be controlled, for example, by introducing a carboxy group into the PVDF type resin. The introduction and introduction amount of a carboxy group into the PVDF type resin can be controlled by using a monomer having a carboxy group as a polymerization component of the PVDF type resin (for example, (meth)acrylic acid, (meth)acrylate, maleic acid, maleic anhydride, maleate, and fluorine-substituted products thereof), and controlling a polymerization ratio thereof.

The PVDF type resin contained in the heat-resistant porous layer preferably has a fibril diameter of from 10 nm to 1000 nm from the viewpoint of cycle characteristics of a battery.

As the binder resin of the heat-resistant porous layer, a PVDF type resin or a wholly aromatic polyamide (aramid) is preferable from the viewpoint that a dramatic effect can be obtained by combination thereof with barium sulfate particles having an average primary particle diameter of less than 0.30 µm. By combining a PVDF type resin or a wholly aromatic polyamide (aramid) with barium sulfate particles having an average primary particle diameter of less than 0.30 µm, the heat resistance of the heat-resistant porous layer is dramatically increased as compared with a case where barium sulfate particles having an average primary particle diameter of 0.30 µm or more are used.

The content ratio of the binder resin in the heat-resistant porous layer is preferably 70% by volume or less, more preferably 65% by volume or less, still more preferably 63% by volume or less, and particularly preferably 60% by volume or less in terms of volume ratio from the viewpoint of imparting heat resistance. In addition, the content ratio of the binder resin is preferably more than 50% by volume, and more preferably 52% by volume or more in terms of a volume ratio from the viewpoint of preventing the peeling or falling off of the heat-resistant porous layer from the porous substrate.

In the separator of the present disclosure, the heat-resistant porous layer may contain a resin other than the binder resin.

The other resin is used for the purpose of improving adhesiveness of the heat-resistant porous layer to an electrode, adjusting ion permeability or film resistance of the heat-resistant porous layer, and the like.

Examples of the other resin include a fluorinated rubber, a styrene-butadiene copolymer, an acrylic type resin, a styrene-acrylic type resin, a homopolymer or a copolymer of a vinyl nitrile compound (acrylonitrile, methacrylonitrile, or the like), carboxymethyl cellulose, a hydroxyalkyl cellulose, a polyvinyl alcohol, a polyvinyl butyral, a polyvinyl pyrrolidone, and a polyether (polyethylene oxide, polypropylene oxide, or the like).

In the separator of the disclosure, when the heat-resistant porous layer contains other resins, the total content of the other resins other than the binder resin contained in the heat-resistant porous layer is preferably 50% by mass or less, more preferably 30% by mass or less, and still more preferably 10% by mass or less with respect to the total amount of the resins contained in the heat-resistant porous layer. The lower limit of the total content of the other resins may be a value more than 0% by mass.

—Barium Sulfate Particles—

The separator of the disclosure contains barium sulfate particles in the heat-resistant porous layer.

Since the heat-resistant porous layer selectively contains barium sulfate particles among the particles, gas generation due to decomposition of the electrolytic solution or the electrolyte is suppressed.

The average primary particle diameter of the barium sulfate particles contained in the heat-resistant porous layer is from 0.01 µm to less than 0.30 µm. The lower limit of the average primary particle diameter is preferably 0.05 µm or more, and more preferably 0.10 µm or more. The upper limit of the average primary particle diameter is preferably 0.28 µm or less, and more preferably 0.25 µm or less.

The average primary particle diameter of the barium sulfate particles is 0.01 µm or more from the viewpoint of the availability or the viewpoint of the aggregability of the barium sulfate particles. When the average primary particle diameter of the barium sulfate particles is less than 0.30 µm, the number of protrusions protruding from the surface of the heat-resistant porous layer is small, and the shrinkage of the heat-resistant porous layer when exposed to a high temperature can be suppressed, so that excellent heat resistance is obtained.

The average primary particle diameter of the filler is determined by measuring the major diameters of 100 filler particles randomly selected by observation with a scanning electron microscope (SEM), and averaging the major diameters of 100 filler particles. The sample to be subjected to SEM observation is filler particles as a material of the heat-resistant porous layer or filler particles taken out from the separator. The method of taking out the filler particles from the separator is not limited, and examples thereof include a method in which the separator is heated to about 800° C. to remove the binder resin and take out the filler particles, and a method in which the separator is immersed in an organic solvent to dissolve the binder resin with the organic solvent and take out the filler particles.

When the average primary particle diameter of the filler is small, or when the aggregation of the filler is remarkable and the major diameter of the filler cannot be measured, the specific surface area of the filler is measured by the BET method, and assuming that the filler is a true sphere, the particle size is calculated from the specific gravity and the specific surface area of the filler according to the following formula.

$$\text{Average primary particle diameter } (\mu m) = 6 \div [\text{specific gravity } (g/cm^3) \times \text{BET specific surface area } (m^2/g)]$$

Note that in the measurement of the specific surface area by the BET method, an inert gas is used as an adsorbent, and the adsorbent is adsorbed onto the surfaces of the filler particles at a boiling point temperature (−196° C.) of liquid nitrogen. The amount of gas adsorbed to the sample is measured as a function of the pressure of the adsorbent, and the specific surface area of the sample is determined from the adsorption amount.

The particle shape of the barium sulfate particles is not limited, and may be any of a spherical shape, an elliptical shape, a plate shape, a needle shape, and an amorphous shape. The barium sulfate particles contained in the heat-resistant porous layer are preferably plate-shaped or spherical particles or primary particles that are not aggregated, from the viewpoint of suppressing the short circuit of the battery and from the viewpoint that fillers are easily densely packed.

The volume ratio of the barium sulfate particles in the heat-resistant porous layer is 30% by volume or more, preferably 35% by volume or more, more preferably 37% by volume or more, and still more preferably 40% by volume or more from the viewpoint of heat resistance.

On the other hand, when the volume ratio of the barium sulfate particles in the heat-resistant porous layer is too large, the heat-resistant porous layer may be easily peeled off from the porous substrate. When the heat-resistant porous layer falls off, coating defects occur, and the productivity of the separator may be deteriorated. When the volume ratio of the barium sulfate particles increases, the surface area of the barium sulfate particles increases, so that the interaction with the binder resin increases, and the viscosity of the coating liquid for forming the heat-resistant porous layer may increase. When the viscosity of the coating liquid is high, coating streaks, wrinkles, and the like are generated, so that the coating appearance tends to deteriorate, and the productivity of the separator may deteriorate. From such a viewpoint, the volume ratio of barium sulfate particles in the heat-resistant porous layer is less than 50% by volume, and preferably 48% by volume or less.

The content ratio (barium sulfate particles/binder resin ratio) of the barium sulfate particles and the binder resin contained in the heat-resistant porous layer is preferably 32/68 to 49/51 and more preferably 36/64 to 48/52 in terms of volume ratio.

In the separator of the present disclosure, the heat-resistant porous layer may contain inorganic particles other than the barium sulfate particles. However, the volume ratio of the other inorganic particles in the heat-resistant porous layer is preferably 20% by volume or less, more preferably 10% by volume or less, still more preferably 5% by volume or less, and particularly preferably the other inorganic particles are substantially not contained.

Examples of the other inorganic particles include: particles of a metal hydroxide such as aluminum hydroxide, magnesium hydroxide, calcium hydroxide, chromium hydroxide, zirconium hydroxide, cerium hydroxide, nickel hydroxide, or boron hydroxide; particles of a metal oxide such as silica, alumina, titania, zirconia, or magnesium oxide; particles of a carbonate such as calcium carbonate or magnesium carbonate; particles of a sulfate such as calcium sulfate; and a clay mineral such as calcium phosphate, apatite, calcium silicate or talc. As the other inorganic particles, particles of a metal hydroxide or particles of a metal oxide are preferable from viewpoints of stability to an electrolytic solution and electrochemical stability. The other inorganic particles may be surface-modified with a silane coupling agent or the like.

The particle shape of each of the other inorganic particles is not limited, and may be a spherical shape, an elliptical shape, a plate shape, a needle shape, or an amorphous shape. The other inorganic particles contained in the heat-resistant porous layer are preferably spherical shaped particles, plate-shaped particles or non-aggregated primary particles from the viewpoint of suppressing short circuit of a battery.

The other inorganic particles may be used singly or in combination of two or more kinds thereof.

The other inorganic particles preferably have an average primary particle diameter of from 0.01 µm to 5.00 µm. A lower limit thereof is more preferably 0.10 µm or more, and an upper limit thereof is more preferably 1.00 µm or less.

In the separator of the present disclosure, the heat-resistant porous layer may contain an organic filler.

Examples of the organic filler include particles of a crosslinked polymer such as crosslinked poly (meth)acrylic acid, crosslinked poly (meth)acrylate, crosslinked polysilicone, crosslinked polystyrene, crosslinked polydivinylbenzene, a styrene-divinylbenzene copolymer crosslinked product, a melamine resin, a phenol resin, or a benzoguanamine-formaldehyde condensate; and particles of a heat-resistant polymer such as polysulfone, polyacrylonitrile, aramid, or polyacetal. These organic fillers may be used singly or in combination of two or more kinds thereof.

In the separator of the present disclosure, the heat-resistant porous layer may contain an additive, for example, a dispersant such as a surfactant, a wetting agent, an antifoaming agent, or a pH adjuster. The dispersant is added to a coating liquid for forming a heat-resistant porous layer for the purpose of improving dispersibility, coatability, or storage stability. The wetting agent, the antifoaming agent, or the pH adjuster is added to a coating liquid for forming a heat-resistant porous layer for the purpose of, for example, improving compatibility with the porous substrate, suppressing mixing of air into the coating liquid, or adjusting the pH.

~Characteristics of Heat-Resistant Porous Layer~

The thickness of the heat-resistant porous layer is preferably 0.5 µm or more and more preferably 1 µm or more in terms of the thickness of one side from the viewpoint of heat resistance or handleability of the separator. The thickness of the heat-resistant porous layer is preferably 5 µm or less and more preferably 4 µm or less in terms of the thickness of one side from the viewpoint of the handleability of the separator or the energy density of the battery.

The thickness of the heat-resistant porous layer is preferably 1 µm or more and more preferably 2 µm or more as the total thickness of the heat-resistant porous layers on both sides in both cases where the heat-resistant porous layer is present only on one side of the porous substrate and where the heat-resistant porous layer is present on both sides. The total thickness is preferably 10 µm or less, and more preferably 8 µm or less.

The mass of the heat-resistant porous layer per unit area is preferably 1.0 g/m² or more, more preferably 2.0 g/m² or more, still more preferably 3.5 g/m² or more, still more preferably 4.0 g/m² or more, and even still more preferably 4.5 g/m² or more as the total mass of the heat-resistant porous layers on both sides from the viewpoint of the heat resistance or handleability of the separator. The mass of the heat-resistant porous layer per unit area is preferably 30.0 g/m² or less, more preferably 20.0 g/m² or less, still more preferably 10.0 g/m² or less, and still more preferably 8.0 g/m² or less as the total mass of the heat-resistant porous layers on both sides from the viewpoint of the handleability of the separator or the energy density of the battery.

When the heat-resistant porous layer is present on both sides of the porous substrate, the difference between the mass of one heat-resistant porous layer and the mass of the other heat-resistant porous layer is preferably 20% by mass or less with respect to the total mass of both sides from the viewpoint of suppressing the curling of the separator.

The porosity of the heat-resistant porous layer is preferably 30% or more from the viewpoint of ion permeability of the separator, and is preferably 80% or less, more preferably 70% or less, still more preferably 60% or less, and further still more preferably 50% or less from the viewpoint of thermal dimensional stability of the separator. The porosity ε (%) of the heat-resistant porous layer is determined by the following formula.

$$\varepsilon = \{1 - (Wa/da + Wb/db + Wc/dc + \ldots + Wn/dn)/t\} \times 100$$

Here, the constituent materials of the heat-resistant porous layer are represented by a, b, c, . . . , n, the mass of each constituent material is represented by Wa, Wb, Wc, . . . , or Wn (g/cm²), the true density of each constituent material is represented by da, db, dc, . . . , or do (g/cm³), and the thickness of the heat-resistant porous layer is represented by t (cm).

The average pore size of the heat-resistant porous layer is preferably from 10 nm to 200 nm. In a case where the average pore size is 10 nm or more, when the heat-resistant porous layer is impregnated with an electrolytic solution, the pores are hardly blocked even if a resin contained in the heat-resistant porous layer swells. In a case where the average pore size is 200 nm or less, uniformity in ion transfer is high, and a battery has excellent cycle characteristics and load characteristics.

The average pore size (nm) of the heat-resistant porous layer is calculated by the following formula, assuming that all pores are cylindrical.

$$d = 4 \, V/S$$

In the formula, d represents an average pore size (diameter) of the heat-resistant porous layer, V represents a pore volume per square meter of the heat-resistant porous layer, and S represents a pore surface area per square meter of the heat-resistant porous layer.

The pore volume V per square meter of the heat-resistant porous layer is calculated from the porosity of the heat-resistant porous layer.

The pore surface area S per square meter of the heat-resistant porous layer is determined by the following method.

First, a specific surface area (m²/g) of the porous substrate and a specific surface area (m²/g) of the separator are calculated from a nitrogen gas adsorption amount by applying a BET formula to a nitrogen gas adsorption method. These specific surface areas (m²/g) are multiplied by basis weights (g/m²) of the porous substrate and the separator, respectively, to calculate a pore surface area per square meter. Then, the pore surface area per square meter of the porous substrate is subtracted from the pore surface area per square meter of the separator to calculate the pore surface area S per square meter of the heat-resistant porous layer.

The peel strength between the porous substrate and the heat-resistant porous layer is preferably 0.1 N/10 mm or more, more preferably 0.2 N/10 mm or more, and still more preferably 0.3 N/10 mm or more from the viewpoint of the adhesive strength of the separator to an electrode. A higher peel strength between the porous substrate and the heat-resistant porous layer is more preferable from the above viewpoint. However, in general, the peel strength is preferably 2 N/10 mm or less. In a case where the separator of the present disclosure has heat-resistant porous layers on both sides of the porous substrate, the peel strength between the porous substrate and each of the heat-resistant porous layers is preferably in the above range on both sides of the porous substrate.

~Characteristics of Separator~

The thickness of the separator of the present disclosure is preferably 10 µm or more, and more preferably 12 µm or more from the viewpoint of the mechanical strength of the separator. The thickness of the separator is preferably 25 µm or less, and more preferably 20 µm or less from the viewpoint of the energy density of a battery.

The puncture strength of the separator of the present disclosure is preferably from 250 g to 1000 g, and more preferably from 300 g to 600 g from the viewpoint of the mechanical strength of the separator or the short-circuit resistance of a battery. A method of measuring the puncture strength of the separator is similar to a method of measuring the puncture strength of the porous substrate.

The porosity of the separator of the present disclosure is preferably from 30% to 60% from the viewpoint of adhesiveness to an electrode, the handleability of the separator, the ion permeability thereof, or the mechanical strength thereof.

The separator of the present disclosure has a Gurley value (JIS P8117: 2009) of preferably from 50 seconds/100 mL to 800 seconds/100 mL, more preferably from 100 seconds/100 mL to 400 seconds/100 mL from the viewpoint of a balance between mechanical strength and ion permeability.

The separator of the present disclosure has, as a value obtained by subtracting a Gurley value of the porous substrate from a Gurley value of the separator, preferably 300 seconds/100 mL or less, more preferably 150 seconds/100 mL or less, still more preferably 100 seconds/100 mL or less from the viewpoint of ion permeability. A lower limit of the value obtained by subtracting a Gurley value of the porous substrate from a Gurley value of the separator is not particularly limited, but is usually 10 seconds/100 mL or more in the separator of the present disclosure.

The separator of the present disclosure preferably has a film resistance of from 1 Ω·cm² to 10 Ω·cm² from the viewpoint of load characteristics of a battery. Here, the film resistance of the separator refers to a resistance value in a state where the separator is impregnated with an electrolytic solution, and is measured by an AC method at 20° C. using 1 mol/L LiBF$_4$-propylene carbonate:ethylene carbonate (mass ratio 1:1) as the electrolytic solution. The separator with a lower film resistance value has better ion permeability.

The separator of the present disclosure preferably has a tortuosity ratio of from 1.5 to 2.5 from the viewpoint of ion permeability.

The amount of water (based on mass) contained in the separator of the present disclosure is preferably 1000 ppm or less. With a smaller amount of water in the separator, a reaction between an electrolytic solution and water can be further suppressed, and generation of gas in a battery can be further suppressed to improve the cycle characteristics of the battery in a case where the battery is formed. The amount of water contained in the separator is more preferably 800 ppm or less, and still more preferably 500 ppm or less from this viewpoint.

The separator of the present disclosure has a shrinkage ratio, when heat-treated at 135° C. for 1 hour, in an MD of preferably 30% or less, more preferably 20% or less, still more preferably 15% or less, still more preferably 10% or less, and particularly preferably 0%.

The separator of the present disclosure has a shrinkage ratio, when heat-treated at 135° C. for 1 hour, in a TD of preferably 30% or less, more preferably 20% or less, still more preferably 15% or less, still more preferably 10% or less, and particularly preferably 0%.

The separator of the present disclosure has an area shrinkage ratio, when heat-treated at 135° C. for 1 hour, of preferably 30% or less, more preferably 20% or less, still more preferably 15% or less, still more preferably 10% or less, and particularly preferably 0%.

The separator of the present disclosure has a shrinkage ratio, when heat-treated at 150° C. for 1 hour, in an MD of preferably 70% or less, more preferably 55% or less, still more preferably 45% or less, still more preferably 20% or less, and still more preferably 10%.

The separator of the present disclosure has a shrinkage ratio, when heat-treated at 150° C. for 1 hour, in a TD of preferably 70% or less, more preferably 55% or less, still more preferably 45% or less, still more preferably 20% or less, and still more preferably 10%.

The separator of the present disclosure has an area shrinkage ratio, when heat-treated at 150° C. for 1 hour, of preferably 70% or less, more preferably 55% or less, still more preferably 45% or less, still more preferably 20% or less, and still more preferably 10%.

The area shrinkage ratio when the separator is heated at 135° C. or 150° C. for one hour is determined by the following measuring method.

The separator is cut out into a rectangle of 180 mm in an MD×60 mm in a TD to prepare a test piece. This test piece is marked at points of 20 mm and 170 mm from one end on a line bisecting the test piece in a TD length (referred to as points A and B, respectively). Furthermore, the test piece is marked at points of 10 mm and 50 mm from one end on a line bisecting the test piece in an MD length (referred to as points C and D, respectively). A clip is attached to the marked test piece (a point where the clip is attached is between the point A and an end closest to the point A). The test piece is hung in an oven in which the temperature is adjusted to 135° C. or 150° C. to be heated under no tension for one hour. A length between A and B and a length between C and D are measured before and after the heat treatment, and an area shrinkage ratio is calculated by the following formula.

$$\text{Area shrinkage ratio (\%)} = \{1-(\text{length between } A \text{ and } B \text{ after heat treatment} \div \text{length between } A \text{ and } B \text{ before heat treatment}) \times (\text{length between } C \text{ and } D \text{ after heat treatment} \div \text{length between } C \text{ and } D \text{ before heat treatment})\} \times 100$$

The shrinkage ratio of the separator of the present disclosure at the time of the heat treatment can be controlled by, for example, the content of inorganic particles in the heat-resistance porous layer, the thickness of the heat-resistance porous layer, or the porosity of the heat-resistance porous layer.

The separator of the present disclosure may further include other layers other than the porous substrate and the heat-resistance porous layer. Examples of the other layer include an adhesive layer mainly for the purpose of improving adhesiveness of the separator.

[Method of Producing Separator]

The separator of the present disclosure can be produced, for example, by forming the heat-resistant porous layer on the porous substrate by a wet coating method or a dry coating method. In the disclosure, the wet coating method is a method of solidifying a coating layer in a coagulation liquid, and the dry coating method is a method of drying a coating layer to solidify the coating layer. Hereinafter, embodiment examples of the wet coating method will be described.

The wet coating method is a method of applying a coating liquid containing a binder resin and barium sulfate particles onto a porous substrate, immersing the resulting product in a coagulation liquid to solidify the coating layer, pulling the resulting product out of the coagulation liquid, washing the resulting product with water, and drying the resulting product.

The coating liquid for forming the heat-resistant porous layer is prepared by dissolving or dispersing a binder resin and barium sulfate particles in a solvent. In the coating liquid, a component other than the binder resin and the barium sulfate particles is dissolved or dispersed, if necessary.

A solvent used for preparing the coating liquid includes a solvent that dissolves the binder resin (hereinafter, also referred to as "good solvent"). Examples of the good solvent include a polar amide solvent such as N-methylpyrrolidone, dimethylacetamide, or dimethylformamide.

The solvent used for preparing the coating liquid preferably contains a phase separation agent that induces phase separation from the viewpoint of forming a porous layer having a favorable porous structure. Therefore, the solvent used for preparing the coating liquid is preferably a mixed solvent of a good solvent and a phase separation agent. The phase separation agent is preferably mixed with a good solvent in such an amount that a viscosity suitable for coating can be ensured. Examples of the phase separation agent include water, methanol, ethanol, propyl alcohol, butyl alcohol, butanediol, ethylene glycol, propylene glycol, and tripropylene glycol.

The solvent used for preparing the coating liquid is preferably a mixed solvent of a good solvent and a phase separation agent, containing 60% by mass or more of the good solvent and 40% by mass or less of the phase separation agent from the viewpoint of forming a favorable porous structure.

The resin concentration of the coating liquid is preferably from 1% by mass to 20% by mass from the viewpoint of forming a favorable porous structure. The inorganic particle concentration of the coating liquid is preferably from 2% by mass to 50% by mass from the viewpoint of forming a favorable porous structure.

Examples of a means of applying the coating liquid to the porous substrate include a Meyer bar, a die coater, a reverse roll coater, a roll coater, and a gravure coater. In a case where the heat-resistant porous layers are formed on both sides of the porous substrate, it is preferable to simultaneously apply the coating liquid to both sides of the porous substrate from the viewpoint of productivity.

The coating layer is solidified by immersing the porous substrate on which the coating layer is formed in a coagulation liquid, and solidifying the binder resin while phase separation is induced in the coating layer. As a result, a laminated body composed of the porous substrate and the heat-resistant porous layer is obtained.

The coagulation liquid generally contains the good solvent and the phase separation agent used for preparing the coating liquid, and water. A mixing ratio between the good solvent and the phase separation agent is preferably matched with the mixing ratio of the mixed solvent used for preparing the coating liquid in terms of production. The content of water in the coagulation liquid is preferably from 40% by mass to 90% by mass from viewpoints of formation of a porous structure and productivity. The temperature of the coagulation liquid is, for example, from 20° C. to 50° C.

After the coating layer is solidified in the coagulation liquid, the laminated body is pulled out of the coagulation liquid and washed with water. By washing the laminated body with water, the coagulation liquid is removed from the laminated body. Furthermore, by drying the laminated body, water is removed from the laminated body. Washing with water is performed, for example, by transporting the laminated body in a water washing bath. Drying is performed, for example, by transporting the laminated body in a high-temperature environment, blowing air to the laminated body, or bringing the laminated body into contact with a heat roll. The drying temperature is preferably from 40° C. to 80° C.

The separator of the present disclosure can also be produced by a dry coating method. The dry coating method is a method of applying a coating liquid to a porous substrate, drying the coating layer to remove a solvent by evaporation, and thereby forming a heat-resistant porous layer on the porous substrate.

The separator of the present disclosure can also be produced by a method of preparing a heat-resistant porous layer as an independent sheet, stacking the heat-resistant porous layer on a porous substrate, and forming a composite by thermal press bonding or an adhesive. Examples of the method of preparing a heat-resistant porous layer as an independent sheet include a method of forming a heat-resistant porous layer on a release sheet by applying the above-described wet coating method or dry coating method.

<Non-Aqueous Secondary Battery>

A non-aqueous secondary battery of the present disclosure is a non-aqueous secondary battery that obtains an electromotive force by doping/dedoping lithium, and includes a positive electrode, a negative electrode, and a separator for a non-aqueous secondary battery of the present disclosure. The doping means occlusion, support, adsorption, or insertion, and means a phenomenon that lithium ions enter an active material of an electrode such as a positive electrode.

The non-aqueous secondary battery of the present disclosure has a structure in which, for example, a battery element in which a negative electrode and a positive electrode face each other with a separator interposed therebetween is enclosed in an exterior material together with an electrolytic solution. The non-aqueous secondary battery of the present disclosure is suitable for a non-aqueous electrolyte secondary battery, particularly for a lithium ion secondary battery.

The non-aqueous secondary battery of the present disclosure has excellent safety because the separator of the present disclosure suppresses generation of gas inside the battery and has excellent heat-resistance.

Hereinafter, aspect examples of the positive electrode, negative electrode, electrolyte solution, and exterior material included in the non-aqueous secondary battery according to the present disclosure will be described.

Examples of an embodiment of the positive electrode include a structure in which an active material layer containing a positive electrode active material and a binder resin is formed on a current collector. The active material layer may further contain a conductive auxiliary agent. Examples of the positive electrode active material include a lithium-containing transition metal oxide, and specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$. Examples of the binder resin include a polyvinylidene fluoride type resin, and a styrene-butadiene copolymer. Examples of the conductive auxiliary agent include carbon materials such as acetylene black, Ketjen black, and graphite powder. Examples of the current collector include an aluminum foil, a titanium foil, and a stainless steel foil, each having a thickness of from 5 μm to 20 μm.

In the non-aqueous secondary battery according to the present disclosure, when the heat-resistant porous layer of the separator of the present disclosure includes a polyvinylidene fluoride type resin, since a polyvinylidene fluoride type resin has excellent oxidation resistance, when the heat-resistant porous layer is disposed by contacting the positive electrode of the non-aqueous secondary battery, a positive electrode active material that can be operated at a high voltage of 4.2 V or more, such as $LiMn_{1/2}Ni_{1/2}O_2$ and $LiCo_{1/3}Mn_{1/3}Ni_{1/3}O_2$, can be easily applicable.

Examples of an embodiment of the negative electrode include a structure in which an active material layer containing a negative electrode active material and a binder resin is formed on a current collector. The active material layer may further contain a conductive auxiliary agent. Examples of the negative electrode active material include materials capable of electrochemically occluding lithium. Specific examples thereof include carbon materials; and alloys of lithium in combination with silicon, tin, aluminum; wood's alloy, or the like. Examples of the binder resin include a polyvinylidene fluoride type resin and a styrene-butadiene copolymer. Examples of the conductive auxiliary agent include carbon materials such as acetylene black, Ketjen black, and graphite powder. Examples of the current collector include a copper foil, a nickel foil, and a stainless steel foil, each having a thickness of from 5 μm to 20 μm. Instead of using the negative electrode described above, a metal lithium foil may be used as the negative electrode.

The electrolyte solution is, for example, a solution in which a lithium salt is dissolved in a non-aqueous solvent. Examples of the lithium salt include $LiPF_6$, $LiBF_4$, and $LiClO_4$. Examples of the non-aqueous solvent include cyclic carbonates such as ethylene carbonate, propylene carbonate, fluoroethylene carbonate, difluoroethylene carbonate, and vinylene carbonate; chain carbonates such as dimethyl carbonate, diethyl carbonate, ethyl methyl carbonate, and a fluorine-substituted compound thereof; and cyclic esters such as γ-butyrolactone and γ-valerolactone. These non-aqueous solvent may be used singly, or in combination. As the electrolyte solution, a solution is preferred, which is obtained by mixing a cyclic carbonate and a chain carbonate at a mass ratio (cyclic carbonate:chain carbonate) of from 20:80 to 40:60, and dissolving a lithium salt therein to give a concentration of from 0.5 mol/L to 1.5 mol/L.

Examples of the exterior material include a metal can and an aluminum laminated film pack. The shape of the battery may be a square shape, a cylindrical shape, a coin shape, and the like, but the separator of the present disclosure is suitable for any one of these shapes.

Examples of a method of producing the non-aqueous secondary battery of the present disclosure include a production method including impregnating a separator with an electrolytic solution and subjecting the separator to a heat press treatment (referred to as "wet heat press" in the present disclosure) to bond the separator to an electrode; and a production method including subjecting a separator to a heat press treatment without causing the separator to be impregnated with an electrolytic solution (referred to as "dry heat press" in the present disclosure) to bond the separator to an electrode.

The non-aqueous secondary battery of the present disclosure can be produced by disposing the separator of the present disclosure between a positive electrode and a negative electrode, winding the resulting product in a length direction to produce a wound body, and then performing, for example, the following production methods 1 to 3 using this wound body. The same applies to a case of using an element produced by a method of stacking at least one layer of a positive electrode, at least one layer of a separator, and at least one layer of a negative electrode in this order (a so-called stack method) instead of the wound body.

Production method 1: The wound body is dry-heat-pressed to bond the electrodes to the separator. Thereafter, the resulting product is housed in an exterior material (for example, an aluminum laminated film pack. The same applies hereinafter), and an electrolytic solution is injected therein. The wound body is further wet-heat-pressed from the outside of the exterior material to perform adhesion between the electrodes and the separator and sealing of the exterior material.

Production method 2: The wound body is housed in an exterior material, and an electrolytic solution is injected therein. The wound body is wet-heat-pressed from the outside of the exterior material to perform adhesion between the electrodes and the separator and sealing of the exterior material. A wound body may be pressed at room temperature (pressurization at room temperature) before the wound body is housed in the exterior material to temporarily bond the wound body.

Production method 3: The wound body is dry-heat-pressed to bond the electrodes to the separator. Thereafter, the resulting product is housed in an exterior material, and an electrolytic solution is injected therein to perform sealing of the exterior material.

As conditions for wet heat press, press temperature is preferably from 70° C. to 110° C., and press pressure is preferably from 0.5 MPa to 2 MPa. As conditions for dry heat press, press temperature is preferably from 20° C. to 100° C., and press pressure is preferably from 0.5 MPa to 5 MPa. Press time is preferably adjusted according to press temperature and press pressure, and is adjusted, for example, in a range of from 0.5 minutes to 60 minutes.

EXAMPLES

Hereinafter, the separator and the non-aqueous secondary battery of the present disclosure will be described more specifically with reference to Examples. Materials, used amounts, ratios, treatment procedures, and the like illustrated in the following Examples can be changed, if appropriate without departing from the spirit of the present disclosure. Therefore, the range of the separator and the non-aqueous secondary battery of the present disclosure should not be construed as being limited by the specific examples described below.

<Measurement Method and Evaluation Method>

The measurement methods and evaluation methods applied in the examples of the invention and comparative examples are as follows.

[HFP Content of Polyvinylidene Fluoride Type Resin]

The ratio of a hexafluoropropylene monomer unit (HFP unit) in the polyvinylidene fluoride type resin was determined from an NMR spectrum. Specifically, 20 mg of the polyvinylidene fluoride type resin was dissolved in 0.6 mL of heavy dimethyl sulfoxide at 100° C., and a $^{19}$F-NMR spectrum was measured at 100° C.

[Weight-Average Molecular Weight of Polyvinylidene Fluoride Type Resin]

The weight-average molecular weight (Mw) of the polyvinylidene fluoride type resin was measured by gel permeation chromatography (GPC). The molecular weight was measured by GPC using a GPC device "GPC-900" manufactured by JASCO Corporation, using two columns of TSKgel SUPER AWM-H manufactured by Tosoh Corporation, using dimethylformamide for a solvent, under conditions that temperature was 40° C. and a flow rate was 10 mL/min to obtain a molecular weight in terms of polystyrene.

[Average Primary Particle Diameter of Inorganic Particle]

The inorganic filler before being added to the coating liquid for forming the heat-resistant porous layer was used as a sample.

Since it was difficult to measure the major diameter of the primary particles of the barium sulfate particles having a small average primary particle diameter (average primary particle diameter of less than 0.3 μm) by the scanning electron microscope (SEM), the specific gravity (g/cm$^3$) and the BET specific surface area (m$^2$/g) of the barium sulfate particles were measured, and assuming that the barium sulfate particles were true spheres, the average primary particle diameter of the barium sulfate particles was determined according to the following formula. As an apparatus for measuring the BET specific surface area, ASAP 2020 manufactured by Micromeritics was used. The BET specific surface area (m$^2$/g) was determined by a BET multipoint method, which is a gas adsorption method using nitrogen gas. Nitrogen gas was adsorbed on the particles at the boiling point temperature (−196° C.) of liquid nitrogen.

Average primary particle diameter (μm)=6÷[specific gravity (g/cm$^3$)×BET specific surface area (m$^2$/g)]

The average primary particle diameter of the other inorganic particles was determined by measuring the major diameters of 100 inorganic particles randomly selected in the observation by the SEM, and averaging the major diameters of 100 inorganic particles.

[Volume Ratio of Barium Sulfate Particles to Heat-Resistant Porous Layer]

The volume ratio Va (%) of barium sulfate particles in the heat-resistant porous layer was determined by the following formula.

$Va=\{(Xa/Da)/(Xa/Da+Xb/db+Xc/Dc+\ldots+Xn/Dn)\}\times 100$

Here, among constituent materials of the heat-resistant porous layer, barium sulfate particles are a, other constituent materials are b, c, . . . , and n, masses of the respective constituent materials are Xa, Xb, Xc, . . . , and Xn (g), and true densities of the respective constituent materials are Da, db, Dc, . . . , and Dn (g/cm$^3$).

[Thickness of Porous Substrate and Separator]

The thickness (µm) of each of the porous substrate and the separator was determined by measuring 20 points of each of the porous substrate and the separator with a contact type thickness meter (Mitutoyo Corporation, LITEMATIC VL-50) and averaging the measurement. The measurement terminal used was a cylindrical terminal with a diameter of 5 mm, and was adjusted so that a load of 0.01 N was applied during the measurement.

[Thickness of Heat-Resistant Porous Layer]

The thickness (total on both sides, µm) of the heat-resistant porous layer was determined by subtracting the thickness (µm) of the porous substrate from the thickness (µm) of the separator.

[Mass of Heat-Resistant Porous Layer (Coating Amount)]

The separator was cut into a size of 10 cm×10 cm, the mass thereof was measured, and the mass was divided by the area thereof to determine the basis weight (g/m$^2$) of the separator. The porous substrate used for producing the separator was cut into a size of 10 cm×10 cm, the mass thereof was measured, and the mass was divided by the area thereof to determine the basis weight (g/m$^2$) of the porous substrate. The basis weight of the porous substrate was subtracted from the basis weight of the separator to determine the mass of the heat-resistant porous layer per unit area (total mass thereof on both sides, g/m$^2$).

[Porosity of Porous Substrate]

The porosity ε (%) of the porous substrate was determined by the following formula.

$$\varepsilon = \{1 - Ws/(ds \cdot t)\} \times 100$$

Ws: basis weight of porous substrate (g/m$^2$), ds: true density of porous substrate (g/cm$^3$), t: thickness of porous substrate (cm).

[Porosity of Heat-Resistant Porous Layer]

The porosity ε (%) of the heat-resistant porous layer was determined by the following formula.

$$\varepsilon = \{1 - (Wa/da + Wb/db + Wc/dc + \ldots + Wn/dn)/t\} \times 100$$

Here, the constituent materials of the heat-resistant porous layer are represented by a, b, c, . . . , n, the mass of each constituent material is represented by Wa, Wb, Wc, . . . , or Wn (g/cm$^2$), the true density of each constituent material is represented by da, db, dc, . . . , or do (g/cm$^3$), and the thickness of the heat-resistant porous layer is represented by t (cm).

[Gurley Value]

The Gurley value (sec/100 ml) of each of the porous substrate and the separator was measured with a Gurley type densometer (G-B2C manufactured by Toyo Seiki Seisakusho, Ltd.) in accordance with JIS P8117 (2009).

[Film Resistance]

The separator was impregnated with 1 mol/L LiBF$_4$-propylene carbonate:ethylene carbonate (mass ratio 1:1) as an electrolytic solution, sandwiched between aluminum foil electrodes with lead tabs, and sealed in an aluminum pack to prepare a test cell. The resistance (Ω·cm$^2$) of the test cell was measured at temperature of 20° C. by an AC impedance method (measuring frequency 100 kHz).

[Peel Strength Between Porous Substrate and Heat-Resistant Porous Layer]

A T-shaped peel test was performed on the separator. Specifically, a pressure-sensitive adhesive tape (Manufactured by 3M Company, width: 12 mm) was attached to one side of the separator (when the pressure-sensitive adhesive tape was attached, the length direction of the pressure-sensitive adhesive tape was matched with the MD of the separator), and the separator was cut out together with the pressure-sensitive adhesive tape into a size of 12 mm in the TD length and 70 mm in the MD length. The pressure-sensitive adhesive tape was slightly peeled off together with the heat-resistant porous layer immediately below. Two separated ends were held by Tensilon (Orientec Co., Ltd., RTC-1210A), and a T-peel test was performed. Note that the pressure-sensitive adhesive tape was used as a support for peeling off the heat-resistant porous layer from the porous substrate. The tensile speed of the T-peel test was 20 mm/min. A load (N) from 10 mm to 40 mm after start of measurement was sampled at 0.4 mm intervals. An average thereof was calculated and converted into a load per 10 mm width (N/10 mm). Furthermore, the loads of ten test pieces (N/10 mm) were averaged.

[Area Shrinkage Ratio by Heat Treatment]

The separator was cut out into a size of 180 mm in an MD length×60 mm in a TD length to prepare a test piece. This test piece was marked at points of 20 mm and 170 mm from one end on a line bisecting the test piece in the TD length (referred to as points A and B, respectively). Furthermore, the test piece was marked at points of 10 mm and 50 mm from one end on a line bisecting the test piece in the MD length (referred to as points C and D, respectively). A clip was attached to the test piece (a point where the clip was attached was between the point A and an end closest to the point A). The test piece was hung in an oven in which the temperature was adjusted to 120° C., 135° C., or 150° C. to be heated under no tension for one hour. A length between A and B and a length between C and D were measured before and after the heat treatment, and an area shrinkage ratio was calculated by the following formula. Furthermore, the area shrinkage ratios of the ten test pieces were averaged.

Area shrinkage ratio (%)={1−(length between $A$ and $B$ after heat treatment÷length between $A$ and $B$ before heat treatment)×(length between $C$ and $D$ after heat treatment÷length between $C$ and $D$ before heat treatment)}×100

[Spot Heating]

The separator was cut out into a size of MD 50 mm×TD 50 mm to prepare a test piece. The test piece was placed on a horizontal table. A soldering iron having a tip diameter of 2 mm was heated such that the temperature of the tip was 260° C. In this state, the tip of the soldering iron was brought into point contact with a side of the separator for 60 seconds. The area (mm$^2$) of holes formed in the separator by point contact was measured, and the areas of holes of the ten test pieces were averaged. The higher the heat resistance of the separator is, the smaller the area of holes formed in the separator is.

[Amount of Generation of Gas]

The separator was cut into a size of 600 cm$^2$ and put in an aluminum laminated film pack. An electrolytic solution was injected into the pack to impregnate the separator with the electrolytic solution, and the pack was sealed to obtain a test cell. As the electrolytic solution, 1 mol/L mixed solution of LiPF$_6$-ethylen carbonate and ethyl methyl carbonate (LiPF$_6$-ethylene carbonate:ethyl methyl carbonate (mass ratio 3:7)) was used. The test cell was placed in an environment at a temperature of 85° C. for 20 days, and the volume of the test cell was measured before and after the heat treatment. The amount of generation of gas V (=V2−V1, unit: mL) was determined by subtracting the volume V1 of the test cell before the heat treatment from the volume V2 of the test cell after the heat treatment. Furthermore, the amounts of generation of gas V of the ten test cells were averaged.

[Evaluation Test of Coating Appearance]

The separator was cut into a predetermined size (10 cm×30 cm), and observed with transmitted light and reflected light using an optical microscope to observe the presence or absence of defects or foreign matters in the coating layer. Specifically, the defects or foreign matters include missing due to peeling of aggregates, pinholes, aggregates of fillers, coating streaks, and wrinkles.

The evaluation was performed based on the observation, in which a case where no defect or foreign matter was observed in the separator was determined to be acceptable, and a case where the defects or foreign matters were observed was determined to be unacceptable. Specifically, for each separator, 60 arbitrary points were cut into a predetermined size and evaluated, and the ratio (%) of the passed separators was calculated. Based on the acceptance ratio, classification was performed according to the following criteria.

<Criteria>

A: The acceptance rate is 100%.

B: The acceptance ratio is from 95% to less than 100%.

C: The acceptance ratio is from 90% to less than 95%.

D: The acceptance ratio is less than 90%.

<Production of Separator>

Example 1

A polyvinylidene fluoride type resin (VDF-HFP copolymer, VDF:HFP (molar ratio)=97.6:2.4, weight-average molecular weight 1,130,000) was dissolved in a mixed solvent of dimethylacetamide (DMAc) and tripropylene glycol (TPG) (DMAc:TPG=80:20 [mass ratio]) so as to have 4% by mass of resin concentration, and barium sulfate particles ($BaSO_4$; an average primary particle diameter of 0.05 µm) to obtain a coating liquid (P). The barium sulfate particles/binder resin ratio was 48/52 (volume ratio).

An appropriate amount of the coating liquid (P) was placed on a pair of Meyer bars, a polyethylene microporous film (Thickness 9 µm, porosity 36%, Gurley value 168 seconds/100 mL) was passed between the Meyer bars, and an equal amount of the coating liquid (P) was applied to both sides. This was immersed in a coagulation liquid (DMAc:TPG:water=30:8:62 [mass ratio] and liquid temperature 40° C.) to solidify the coating layer, then washed in a water washing tank having a water temperature of 40° C., and dried. In this way, a separator in which a heat-resistant porous layer was formed on both sides of a polyethylene microporous film was obtained.

Examples 2 and 3

A separator was prepared in a manner similar to Example 1 except that the volume ratio of barium sulfate particles was changed as shown in Table 1.

Example 4

A separator was prepared in a manner similar to Example 1 except that the barium sulfate particles were changed to other barium sulfate particles (average primary particle diameter: 0.10 µm).

Example 5

A separator was prepared in a manner similar to Example 1 except that the barium sulfate particles were changed to other barium sulfate particles (average primary particle diameter: 0.25 µm).

Comparative Examples 1 and 4

A separator was prepared in a manner similar to Example 1 except that the volume ratio of barium sulfate particles was changed as shown in Table 1.

Comparative Example 2

A separator was prepared in a manner similar to Example 1 except that the barium sulfate particles were changed to other barium sulfate particles (average primary particle diameter: 0.30 µm).

Comparative Example 3

A separator was prepared in a manner similar to Example 1 except that the barium sulfate particles were changed to other barium sulfate particles (average primary particle diameter: 0.70 µm).

Comparative Example 5

Except that the barium sulfate particles were changed to other barium sulfate particles (average primary particle diameter: 0.30 µm), and the volume ratio was changed as shown in Table 1, the same procedure as in Example 1 was carried out to prepare a separator.

Comparative Example 6

Except that the barium sulfate particles were changed to other barium sulfate particles (average primary particle diameter: 0.70 µm), and the volume ratio was changed as shown in Table 1, the same procedure as in Example 1 was carried out to prepare a separator.

Comparative Example 7

A separator was prepared in a manner similar to Example 1 except that the barium sulfate particles were changed to magnesium hydroxide (average primary particle diameter: 0.50 µm).

Comparative Example 8

A separator was prepared in a manner similar to Example 1 except that the barium sulfate particles were changed to magnesium hydroxide (average primary particle diameter: 0.90 µm).

Comparative Example 9

A separator was prepared in a manner similar to Example 1 except that the barium sulfate particles were changed to alumina (average primary particle diameter: 0.60 µm).

Example 6

A meta-wholly aromatic polyamide (In Table 2, denoted as aramid) was dissolved in a mixed solvent of dimethylacetamide (DMAc) and tripropylene glycol (TPG) (DMAc:TPG=80:20 [mass ratio]) so as to have 5% by mass of resin concentration, and barium sulfate particles (average primary particle diameter: 0.05 μm) were further stirred and mixed to obtain a coating liquid (A). The barium sulfate particles/binder resin ratio was 42/58 (volume ratio).

An appropriate amount of the coating liquid (A) was placed on the Meyer bar, and the coating liquid (A) was applied to one side of a polyethylene microporous film (thickness 9 μm, porosity 36%, and Gurley value 168 seconds/100 mL). This was immersed in a coagulation liquid (DMAc:TPG:water=30:8:62 [mass ratio] and liquid temperature 40° C.) to solidify the coating layer, then washed in a water washing tank having a water temperature of 40° C., and dried. In this way, a separator in which a heat-resistant porous layer was formed on one side of the polyethylene microporous film was obtained.

Example 7

Except that the thickness, the mass per unit area, and the porosity of the heat-resistant porous layer were changed as shown in Table 2, the same procedure as in Example 6 was carried out to prepare a separator.

Example 8

A separator was prepared in a manner similar to Example 6 except that both sides of the porous substrate were coated with the coating liquid.

Examples 9 and 10

A separator was prepared in a manner similar to Example 6 except that the volume ratio of barium sulfate particles, the thickness of the heat-resistant porous layer, the mass per unit area, and the porosity were changed as shown in Table 2.

Example 11

A separator was prepared in a manner similar to Example 6 except that the barium sulfate particles were changed to other barium sulfate particles (average primary particle diameter: 0.10 μm).

Example 12

A separator was prepared in a manner similar to Example 6 except that the barium sulfate particles were changed to other barium sulfate particles (average primary particle diameter: 0.25 μm).

Comparative Examples 10 and 13

A separator was prepared in a manner similar to Example 6 except that the volume ratio of barium sulfate particles was changed as shown in Table 2.

Comparative Example 11

A separator was prepared in a manner similar to Example 6 except that the barium sulfate particles were changed to other barium sulfate particles (average primary particle diameter: 0.30 μm).

Comparative Example 12

A separator was prepared in a manner similar to Example 6 except that the barium sulfate particles were changed to other barium sulfate particles (average primary particle diameter: 0.70 μm).

Comparative Example 14

Except that the barium sulfate particles were changed to other barium sulfate particles (average primary particle diameter: 0.30 μm), and the volume ratio was changed as shown in Table 2, the same procedure as in Example 6 was carried out to prepare a separator.

Comparative Example 15

Except that the barium sulfate particles were changed to other barium sulfate particles (average primary particle diameter: 0.70 μm), and the volume ratio was changed as shown in Table 2, the same procedure as in Example 6 was carried out to prepare a separator.

Comparative Example 16

A separator was prepared in a manner similar to Example 6 except that the barium sulfate particles were changed to magnesium hydroxide (average primary particle diameter: 0.50 μm).

Comparative Example 17

A separator was prepared in a manner similar to Example 6 except that the barium sulfate particles were changed to magnesium hydroxide (average primary particle diameter: 0.90 μm).

Comparative Example 18

A separator was prepared in a manner similar to Example 6 except that the barium sulfate particles were changed to alumina (average primary particle diameter: 0.60 μm).

The composition, physical properties, and evaluation results of each separator of Examples 1 to 12 and Comparative Examples 1 to 18 are shown in Tables 1 and 2.

TABLE 1

| | | Heat-resistant porous layer | | | | | | Separator | |
| --- | --- | --- | --- | --- | --- | --- | --- | --- | --- |
| | | Inorganic particle | | | | | | | |
| | Binder resin Kind | Kind | Average primary particle diameter [μm] | Content ratio [% by volume] | Coating | Thickness (Total on both sides) [μm] | Coating Amount [g/m²] | Porosity [%] | Thickness [μm] | Gurley value [sec/100 mL] |
| Example 1 | PVDF type | BaSO₄ | 0.05 | 48 | Both sides | 4 | 8.0 | 35 | 13 | 318 |
| Example 2 | PVDF type | BaSO₄ | 0.05 | 42 | Both sides | 5 | 7.0 | 52 | 14 | 260 |
| Example 3 | PVDF type | BaSO₄ | 0.05 | 37 | Both sides | 5 | 6.5 | 53 | 14 | 238 |
| Example 4 | PVDF type | BaSO₄ | 0.10 | 48 | Both sides | 4 | 7.5 | 39 | 13 | 300 |
| Example 5 | PVDF type | BaSO₄ | 0.25 | 48 | Both sides | 4 | 6.0 | 51 | 13 | 263 |

TABLE 1-continued

| | Binder resin | Inorganic particle | Avg primary particle diameter [μm] | Content ratio [% by volume] | Coating | Thickness (Total on both sides) [μm] | Amount [g/m²] | Porosity [%] | Thickness [μm] | Gurley value [sec/100 mL] |
|---|---|---|---|---|---|---|---|---|---|---|
| Comparative Example 1 | PVDF type | BaSO₄ | 0.05 | 28 | Both sides | 5 | 4.8 | 62 | 14 | 222 |
| Comparative Example 2 | PVDF type | BaSO₄ | 0.30 | 48 | Both sides | 4 | 4.0 | 68 | 13 | 228 |
| Comparative Example 3 | PVDF type | BaSO₄ | 0.70 | 48 | Both sides | 5 | 3.8 | 75 | 14 | 198 |
| Comparative Example 4 | PVDF type | BaSO₄ | 0.05 | 61 | Both sides | 5 | 4.5 | 76 | 14 | 226 |
| Comparative Example 5 | PVDF type | BaSO₄ | 0.30 | 61 | Both sides | 5 | 5.1 | 70 | 14 | 232 |
| Comparative Example 6 | PVDF type | BaSO₄ | 0.70 | 61 | Both sides | 5 | 6.0 | 65 | 14 | 210 |
| Comparative Example 7 | PVDF type | Mg(OH)₂ | 0.50 | 61 | Both sides | 6 | 4.2 | 68 | 15 | 201 |
| Comparative Example 8 | PVDF type | Mg(OH)₂ | 0.90 | 61 | Both sides | 6 | 4.5 | 65 | 15 | 205 |
| Comparative Example 9 | PVDF type | Alumina | 0.60 | 61 | Both sides | 5 | 4.6 | 70 | 14 | 205 |

| | Separator | | | | | | |
|---|---|---|---|---|---|---|---|
| | Film resistance [Ω·cm²] | Peeling strength [N/10 mm] | Area shrinkage ratio [%] 120° C. | Area shrinkage ratio [%] 135° C. | Area shrinkage ratio [%] 150° C. | Spot heating [mm²] | Gas generation amount [mL] | Coating appearance evaluation |
|---|---|---|---|---|---|---|---|---|
| Example 1 | 4.1 | 0.3 | 3 | 7 | 10 | 4 | 0 | A |
| Example 2 | 3.9 | 0.5 | 4 | 12 | 40 | 6 | 0 | A |
| Example 3 | 3.8 | 0.7 | 5 | 15 | 45 | 8 | 0 | A |
| Example 4 | 4.0 | 0.4 | 3 | 9 | 15 | 5 | 0 | A |
| Example 5 | 4.0 | 0.5 | 4 | 10 | 35 | 5 | 0 | A |
| Comparative Example 1 | 3.6 | 0.7 | 6 | 40 | 81 | 11 | 0 | A |
| Comparative Example 2 | 3.7 | 0.6 | 5 | 42 | 75 | 9 | 0 | A |
| Comparative Example 3 | 3.5 | 0.7 | 6 | 40 | 80 | 10 | 0 | A |
| Comparative Example 4 | 3.7 | 0.6 | 4 | 14 | 62 | 5 | 0 | D |
| Comparative Example 5 | 3.9 | 0.6 | 4 | 31 | 72 | 8 | 0 | B |
| Comparative Example 6 | 4.2 | 0.7 | 6 | 32 | 75 | 9 | 0 | A |
| Comparative Example 7 | 3.6 | 0.6 | 5 | 32 | 75 | 8 | 7 | A |
| Comparative Example 8 | 4.0 | 0.5 | 6 | 33 | 76 | 9 | 4 | A |
| Comparative Example 9 | 4.4 | 0.6 | 5 | 31 | 74 | 10 | 7 | A |

TABLE 2

| | Heat-resistant porous layer | | | | | | | Separator | |
|---|---|---|---|---|---|---|---|---|---|
| | Binder resin Kind | Inorganic particle Kind | Average primary particle diameter [μm] | Content ratio [% by volume] | Coating | Thickness (Total on both sides) [μm] | Amount [g/m²] | Porosity [%] | Thickness [μm] | Gurley value [sec/100 mL] |
| Example 6 | Aramid | BaSO₄ | 0.05 | 42 | One side | 7 | 5.9 | 69 | 16 | 225 |
| Example 7 | Aramid | BaSO₄ | 0.05 | 42 | One side | 4 | 4.3 | 56 | 13 | 224 |
| Example 8 | Aramid | BaSO₄ | 0.05 | 42 | Both sides | 7 | 5.9 | 69 | 16 | 224 |
| Example 9 | Aramid | BaSO₄ | 0.05 | 36 | One side | 7 | 4.8 | 72 | 16 | 231 |
| Example 10 | Aramid | BaSO₄ | 0.05 | 32 | One side | 7 | 4.5 | 73 | 16 | 228 |
| Example 11 | Aramid | BaSO₄ | 0.10 | 42 | One side | 7 | 5.0 | 72 | 16 | 220 |
| Example 12 | Aramid | BaSO₄ | 0.25 | 42 | One side | 7 | 5.0 | 73 | 16 | 216 |
| Comparative Example 10 | Aramid | BaSO₄ | 0.05 | 27 | One side | 7 | 4.3 | 73 | 16 | 266 |
| Comparative Example 11 | Aramid | BaSO₄ | 0.30 | 42 | One side | 7 | 5.0 | 74 | 16 | 226 |
| Comparative Example 12 | Aramid | BaSO₄ | 0.70 | 42 | One side | 7 | 5.3 | 73 | 16 | 230 |
| Comparative Example 13 | Aramid | BaSO₄ | 0.05 | 70 | One side | 7 | 5.0 | 80 | 16 | 222 |

TABLE 2-continued

| | | | | | | | | | | |
|---|---|---|---|---|---|---|---|---|---|---|
| Comparative Example 14 | Aramid | BaSO₄ | 0.30 | 70 | One side | 7 | 6.2 | 75 | 16 | 226 |
| Comparative Example 15 | Aramid | BaSO₄ | 0.70 | 70 | One side | 7 | 6.9 | 72 | 16 | 235 |
| Comparative Example 16 | Aramid | Mg(OH)₂ | 0.50 | 70 | One side | 7 | 3.6 | 75 | 16 | 227 |
| Comparative Example 17 | Aramid | Mg(OH)₂ | 0.90 | 70 | One side | 7 | 4.4 | 71 | 16 | 231 |
| Comparative Example 18 | Aramid | Alumina | 0.60 | 70 | One side | 7 | 6.3 | 72 | 16 | 232 |

| | Separator | | | | | | | |
|---|---|---|---|---|---|---|---|---|
| | Film resistance | Peeling strength | Area shrinkage ratio [%] | | | Spot heating | Gas generation amount | Coating appearance |
| | [Ω · cm²] | [N/10 mm] | 120° C. | 135° C. | 150° C. | [mm²] | [mL] | evaluation |
| Example 6 | 4.2 | 0.4 | 4 | 6 | 11 | 1 | 2 | A |
| Example 7 | 4.2 | 0.5 | 4 | 7 | 12 | 1 | 2 | A |
| Example 8 | 4.2 | 0.5 | 4 | 6 | 10 | 1 | 2 | A |
| Example 9 | 4.2 | 0.5 | 4 | 7 | 12 | 1 | 2 | A |
| Example 10 | 4.2 | 0.5 | 4 | 8 | 12 | 2 | 2 | A |
| Example 11 | 4.2 | 0.4 | 4 | 8 | 14 | 2 | 2 | A |
| Example 12 | 4.2 | 0.4 | 4 | 8 | 15 | 2 | 2 | A |
| Comparative Example 10 | 4.7 | 0.5 | 4 | 12 | 23 | 3 | 2 | B |
| Comparative Example 11 | 4.1 | 0.4 | 4 | 12 | 30 | 4 | 2 | A |
| Comparative Example 12 | 4.2 | 0.4 | 4 | 14 | 38 | 5 | 2 | A |
| Comparative Example 13 | 4.0 | 0.4 | 4 | 8 | 12 | 3 | 2 | D |
| Comparative Example 14 | 4.0 | 0.4 | 4 | 10 | 22 | 4 | 2 | B |
| Comparative Example 15 | 4.2 | 0.5 | 4 | 12 | 28 | 5 | 2 | A |
| Comparative Example 16 | 4.6 | 0.4 | 4 | 12 | 29 | 5 | 16 | A |
| Comparative Example 17 | 4.9 | 0.4 | 5 | 14 | 31 | 7 | 9 | A |
| Comparative Example 18 | 5.1 | 0.5 | 4 | 13 | 30 | 8 | 17 | A |

In Examples containing the binder resin and barium sulfate particles having a predetermined size and a volume ratio, gas generation was suppressed, the area shrinkage ratio was small, the heat resistance was excellent, and the productivity was also faborable.

In the above Examples, the case where the VDF-HFP copolymer (VDF:HFP (molar ratio)=97.6:2.4, weight-average molecular weight 1,130,000) is used as the polyvinylidene fluoride type resin (PVDF type resin) which is an example of the binder has been mainly described, but the PVDF type resin is not limited to the VDF-HFP copolymer, and a combination of the PVDF type resin and specific barium sulfate particles exhibits the same effect. In addition, the case where aramid is used as the heat-resistant resin which is an example of the binder has been mainly described, but other heat-resistant resins (polyamideimide, poly-N-vinylacetamide, polyacrylamide, copolymerized polyether polyamide, polyimide, polyetherimide, and the like) such as amide-based resins or imide-based resins other than aramid also exhibit similar effects by combination with specific barium sulfate particles.

When Comparative Examples 1 to 9 using a polyvinylidene fluoride type resin (PVDF type resin) are compared with Comparative Examples 10 to 18 using a wholly aromatic polyamide (aramid), Comparative Examples 10 to 18 have smaller area shrinkage ratios at 135° C. and 150° C. This is because aramid has higher heat resistance than PVDF type resin.

When Comparative Examples 1 to 6 using barium sulfate particles are compared with Comparative Examples 7 to 9 using magnesium hydroxide or alumina, the amount of gas generated in Comparative Examples 1 to 6 are smaller. When Comparative Examples 10 to 15 using barium sulfate particles are compared with Comparative Examples 16 to 18 using magnesium hydroxide or alumina, the amount of gas generated in Comparative Examples 10 to 15 is smaller. As described above, the effect of reducing the gas by using the barium sulfate particles was remarkably observed.

The disclosure of Japanese Patent Application No. 2019-052384 filed on Mar. 20, 2019 is incorporated herein by reference in its entirety.

All documents, patent applications, and technical standards described in this specification are incorporated herein by reference to the same extent as if each individual document, patent application, and technical standards were specifically and individually indicated to be incorporated herein by reference.

The invention claimed is:

1. A separator for a non-aqueous secondary battery, the separator comprising:
    a porous substrate; and
    a heat-resistant porous layer that is provided on one side or on both sides of the porous substrate, and that contains a binder resin and barium sulfate particles, wherein an average primary particle diameter of the barium sulfate particles contained in the heat-resistant porous layer is from 0.05 μm to less than 0.30 μm, wherein a volume ratio of the barium sulfate particles in the heat-resistant porous layer is from 30% by volume to less than 50% by volume, wherein the binder resin is a wholly aromatic polyamide, and wherein an area shrinkage ratio of the separator for a non-aqueous secondary battery, when heat-treated at 135° C. for 1 hour, is 10% or less.

2. A separator for a non-aqueous secondary battery, the separator comprising:

a porous substrate; and a heat-resistant porous layer that is provided on one side or on both sides of the porous substrate, and that contains a binder resin and barium sulfate particles, wherein an average primary particle diameter of the barium sulfate particles contained in the heat-resistant porous layer is from 0.05 μm to less than 0.30 μm, wherein a volume ratio of the barium sulfate particles in the heat-resistant porous layer is from 30% by volume to less than 50% by volume, wherein the binder resin is a wholly aromatic polyamide, and wherein an area shrinkage ratio of the separator for a non-aqueous secondary battery, when heat-treated at 150° C. for 1 hour, is 20% or less.

3. The separator for a non-aqueous secondary battery according to claim 1, wherein a porosity of the heat-resistant porous layer is from 30% to 70%.

4. The separator for a non-aqueous secondary battery according to claim 1, wherein a mass per unit area of the heat-resistant porous layer as a total of both sides is from 1.0 g/m² to 30.0 g/m².

5. The separator for a non-aqueous secondary battery according to claim 1, wherein the heat-resistant porous layer is provided on one side of the porous substrate.

6. A non-aqueous secondary battery that obtains electromotive force by lithium doping and dedoping, the non-aqueous secondary battery containing:

a positive electrode;

a negative electrode; and the separator for a non-aqueous secondary battery according to claim 1, the separator being disposed between the positive electrode and the negative electrode.

7. The separator for a non-aqueous secondary battery according to claim 1, wherein the wholly aromatic polyamide is a meta type wholly aromatic polyamide.

8. The separator for a non-aqueous secondary battery according to claim 1, wherein the wholly aromatic polyamide is polymetaphenylene isophthalamide.

9. The separator for a non-aqueous secondary battery according to claim 1, wherein the wholly aromatic polyamide is polyparaphenylene terephthalamide.

10. The separator for a non-aqueous secondary battery according to claim 1, wherein the average primary particle diameter of the barium sulfate particles contained in the heat-resistant porous layer is from 0.05 μm to 0.25 μm.

11. The separator for a non-aqueous secondary battery according to claim 2, wherein a porosity of the heat-resistant porous layer is from 30% to 70%.

12. The separator for a non-aqueous secondary battery according to claim 2, wherein a mass per unit area of the heat-resistant porous layer as a total of both sides is from 1.0 g/m² to 30.0 g/m².

13. The separator for a non-aqueous secondary battery according to claim 2, wherein the heat-resistant porous layer is provided on one side of the porous substrate.

14. A non-aqueous secondary battery that obtains electromotive force by lithium doping and dedoping, the non-aqueous secondary battery containing:

a positive electrode;

a negative electrode; and the separator for a non-aqueous secondary battery according to claim 6, the separator being disposed between the positive electrode and the negative electrode.

15. The separator for a non-aqueous secondary battery according to claim 2, wherein the wholly aromatic polyamide is a meta type wholly aromatic polyamide.

16. The separator for a non-aqueous secondary battery according to claim 2, wherein the wholly aromatic polyamide is polymetaphenylene isophthalamide.

17. The separator for a non-aqueous secondary battery according to claim 2, wherein the wholly aromatic polyamide is polyparaphenylene terephthalamide.

18. The separator for a non-aqueous secondary battery according to claim 2, wherein the average primary particle diameter of the barium sulfate particles contained in the heat-resistant porous layer is from 0.05 μm to 0.25 μm.

* * * * *